US008539511B2

(12) United States Patent
Etzion et al.

(10) Patent No.: US 8,539,511 B2
(45) Date of Patent: Sep. 17, 2013

(54) RETROSPECTIVE EVENT PROCESSING PATTERN LANGUAGE AND EXECUTION MODEL EXTENSION

(75) Inventors: Opher Zvi Etzion, Haifa (IL); Segev Eliezer Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 12/578,604

(22) Filed: Oct. 14, 2009

(65) Prior Publication Data
US 2011/0088035 A1    Apr. 14, 2011

(51) Int. Cl.
*G06F 3/00* (2006.01)
*G06F 17/30* (2006.01)
*G06F 15/16* (2006.01)

(52) U.S. Cl.
USPC ............................ 719/318; 709/231; 707/751

(58) Field of Classification Search
None
See application file for complete search history.

(56) References Cited

U.S. PATENT DOCUMENTS

| | | | |
|---|---|---|---|
| 4,939,683 A | 7/1990 | van Heerden et al. | |
| 6,119,103 A | 9/2000 | Basch et al. | |
| 6,266,773 B1 | 7/2001 | Kisor et al. | |
| 6,373,971 B1 * | 4/2002 | Floratos et al. | 382/129 |
| 7,953,739 B2 * | 5/2011 | York et al. | 707/751 |
| 8,341,647 B2 * | 12/2012 | Tang | 719/318 |
| 2003/0005174 A1 * | 1/2003 | Coffman et al. | 719/318 |
| 2008/0301124 A1 | 12/2008 | Alves et al. | |
| 2008/0301125 A1 * | 12/2008 | Alves et al. | 707/5 |
| 2009/0125635 A1 * | 5/2009 | Barga et al. | 709/231 |
| 2009/0182779 A1 * | 7/2009 | Johnson | 707/200 |
| 2010/0125584 A1 * | 5/2010 | Navas | 707/747 |
| 2010/0325132 A1 * | 12/2010 | Liu et al. | 707/759 |

OTHER PUBLICATIONS

"Retrospective on Aurora", Balakrishnan, 2004, pp. 1-14.*
"On-line Aggregation and Filtering of Pattern-based Queries", Mouza, 2006, pp. 1-10.*
"Examining the Impact of an Information Retrieval Pattern Language on the Design of Information Retrieval Interface", Wania, 2008, pp. 1-281.*
Aleri Inc., "Analyze and Act on Fast Moving Data: An Introduction to Complex Event Processing", 2007.

* cited by examiner

*Primary Examiner* — Tuan Dao

(57) ABSTRACT

A novel and useful method, system and framework for extending event processing pattern language to include constructs and patterns in the language to support historical patterns and associated retrospective event processing that enable a user to define patterns that consist of both on-line streaming and historical (retrospective) patterns. This enables entire functions to be expressed in a single pattern language and also enables event processing optimization whereby function processing is mapped to a plurality of event processing agents (EPAs). The EPAs in turn are assigned to a physical processor and to threads within the processor.

22 Claims, 7 Drawing Sheets

RETROSPECTIVE EVENT PROCESSING PATTERN LANGUAGE AND EXECUTION MODEL EXTENSION

FIELD OF THE INVENTION

The present invention relates to the field of event processing, and more particularly relates to a method, system and framework for extending an event processing language and execution model to handle both on-line streaming and retrospective event processing

SUMMARY OF THE INVENTION

A novel and useful method, system and framework for extending event processing pattern language and execution model to include constructs and patterns in the language to support historical patterns and associated retrospective event processing that enable a user to define patterns that consist of both on-line streaming and historical (retrospective) patterns in a seamless fashion. This enables entire functions to be expressed in a single pattern language and also enables event processing optimization whereby function processing is mapped to a plurality of event processing agents (EPAs). The EPAs in turn are assigned to a physical processor and to threads within the processor.

In one embodiment of the invention, the regular event processing model intended for streaming event is extended to include retrospective event processing which is required as part of regular event processing, typically to reinforce assumptions. The extensions include (1) extending the pattern language to express the retrospective processing; (2) extending the execution model of event processing to support the language expression, by enabling two phased retrospective processing execution based on primary and secondary contexts; and (3) mapping the retrospective pattern functions into physical event processing agents, which becomes part of the application's event processing network (EPN), with the dependencies modeled therein.

These pattern language extensions provide several benefits: (1) developers can use a single language and not a hybrid of two languages in order to develop an application, thereby significantly reducing the cost of the entire application lifecycle; and (2) the mapping into physical EPAs enables the retrospective processing to participate in the optimization process that is based on the structure of an associated EPN graph; if this is not done, then a portion of the application will remain outside the optimization process, possibly making the optimization process invalid, since the retrospective processing might constitute a significant part of the computing requirements.

Note that without the pattern language extensions of the invention, retrospective processing cannot be expressed in the regular streaming event processing model. Prior art systems typically express retrospective processing by a collection of SQL queries. Further, with prior art systems, the query optimization model and the EPN optimization model are different, and if two optimization models are being used, then a global view of resources is not possible, thus making the results non-optimal.

There is thus provided in accordance with the invention, a method of event processing, the method comprising the steps of providing an event processing pattern language; and extending the event processing pattern language to support historical patterns thereby enabling a user to define patterns comprised of both on-line streaming and retrospective historical patterns utilizing a single pattern language.

There is also provided in accordance with the invention, an event processing apparatus comprising an extended event processing pattern language framework comprising both streaming event patterns and retrospective event pattern extensions and an event processing framework operative to support the extended event processing pattern language including retrospective extensions thereby enabling multiphased retrospective processing execution based on multiple contexts.

There is further provided in accordance with the invention, a computer program product for performing event processing, the computer program product comprising a computer usable medium having computer usable code embodied therewith, the computer usable program code comprising computer usable code configured for providing an event processing language suitable for handling streaming event processing and computer usable code configured for adding retrospective pattern language extensions to the event processing language such that the resulting extended event processing language is capable of handling retrospective event processing in addition to the streaming event processing.

There is also provided in accordance with the invention, a computer program product for performing event processing, the computer program product comprising a computer usable medium having computer usable code embodied therewith, the computer usable program code comprising computer usable code configured for providing an event processing pattern language and computer usable code configured for extending the event processing pattern language to support historical patterns thereby enabling a user to define patterns comprised of both on-line streaming and retrospective historical patterns utilizing a single pattern language.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
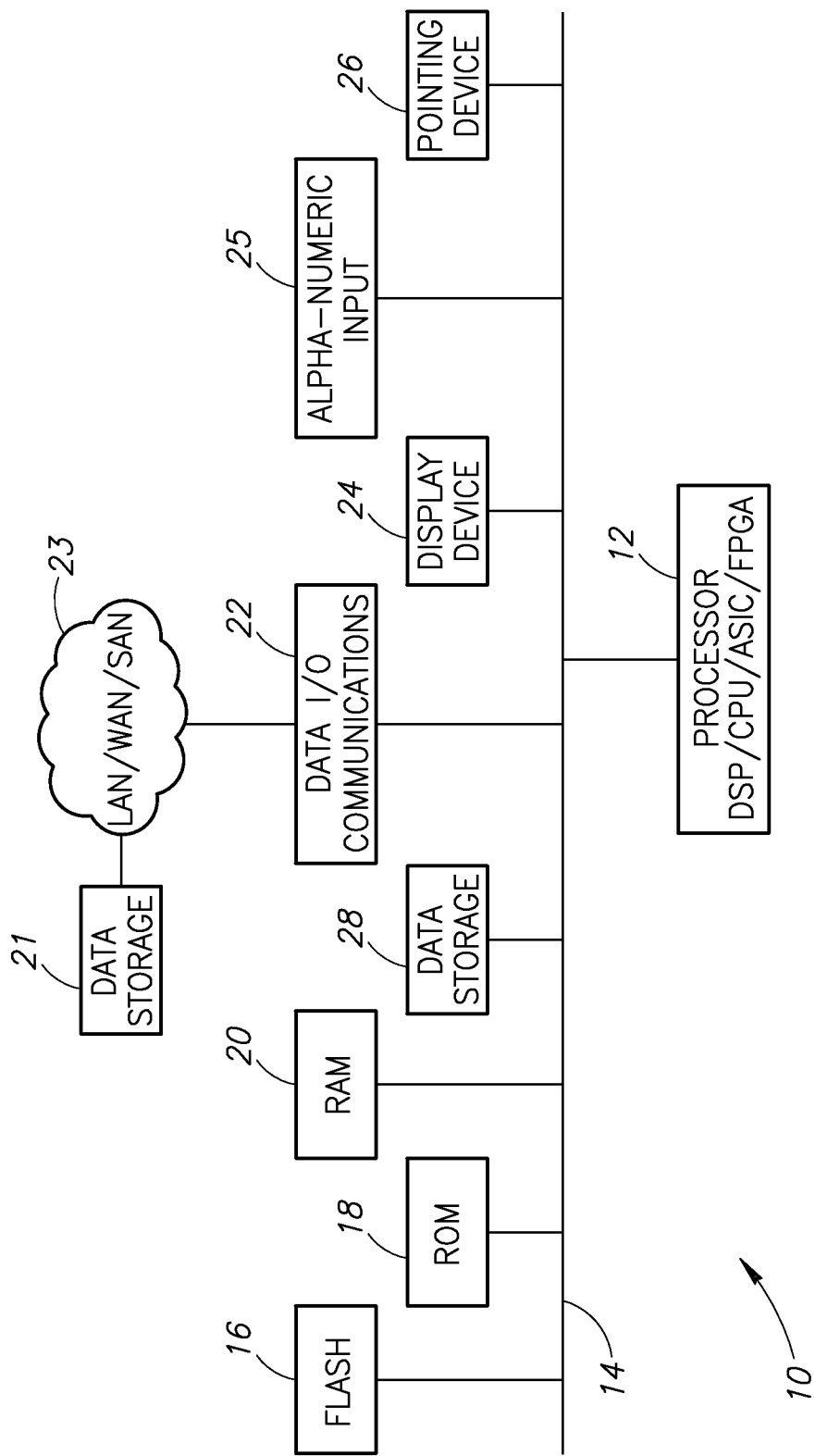
FIG. 1 is a block diagram illustrating an example computer processing system adapted to implement the retrospective event processing mechanism of the present invention.

The following notation is used throughout this document:

| Term | Definition |
| --- | --- |
| ASIC | Application Specific Integrated Circuit |
| CD | Additive White Gaussian Nose |
| CDROM | Compact Disc Read Only Memory |
| CEP | Complex Event Processing |
| CPU | Central Processing Unit |
| DSP | Digital Signal Processor |
| EEROM | Electrically Erasable Read Only Memory |
| EPA | Event Processing Agent |
| EPN | Event Processing Network |
| EPROM | Erasable Programmable Read-Only Memory |
| FPGA | Field Programmable Gate Array |
| FTP | File Transfer Protocol |
| GLS | Generalized Least Squares |
| HTTP | Hyper-Text Transport Protocol |
| LAN | Local Area Network |
| NIC | Network Interface Card |
| OS | Operating System |
| RAM | Random Access Memory |
| RF | Radio Frequency |
| ROM | Read Only Memory |
| SAN | Storage Area Network |
| SQL | Structured Query Language |
| TCP | Transport Control Protocol |
| UDP | User Datagram Protocol |
| URL | Uniform Resource Locator |
| WAN | Wide Area Network |

DETAILED DESCRIPTION OF THE INVENTION

The present invention is a method, system and framework (also referred to in general as the retrospective event processing mechanism) for extending event processing pattern language to include constructs and patterns in the language to support historical patterns and associated retrospective event processing that enable a user to define patterns that consist of both on-line streaming and historical (retrospective) pattern detection. The retrospective event processing mechanism enables entire functions to be expressed in a single pattern detection language and also enables event processing optimization whereby function processing is mapped to a plurality of event processing agents (EPAs). The EPAs in turn are assigned to one or more physical processors and to threads within the one or more processors.

Several advantages of the retrospective event processing mechanism of the present invention include: (1) use of a single event processing pattern language for detecting on-line streaming and historical events significantly improves the usability of the pattern language; (2) the total cost of ownership is greatly lowered in applications that require both on-line streaming and historical types of pattern detection.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement the retrospective event processing mechanism of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 and/or 28 for storing application programs and data. The system comprises computer readable storage medium that may include any suitable memory means, including but not limited to, magnetic storage, optical storage, semiconductor volatile or non-volatile memory or any other memory storage device.

Software adapted to implement the system and methods of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Retrospective Event Processing Mechanism

In many systems it is a requirement to find on-line event patterns that relate to both streaming events and to historical events. Complex event processing (CEP) attempts to find patterns on streaming events. Examples of such pattern matching on streaming events include: XYZ stock has gone up 3% within 2 hours; a patient was admitted to the hospital less than 24 hours after being discharged; and the relative maximal distance of all robberies in which a window was broken was less than 5 miles.

Systems exist that implement such patterns. In some cases, however, there is a need to mix patterns on streaming events, with patterns that are applied repeatedly on past events. Consider for example, that a person who has deposited (in aggregate) more than $20,000 within a single working day is a SUSPECT in money laundering (i.e. the streaming event pattern). To reinforce the suspicion a modal pattern is applied to the past: There has been a period of a week within the last year in which the same person has deposited (in aggregate) $50,000 or more and has withdrawn (in aggregate) at least $50,000 within the same week.

In another example, an electronic trade site provides customers with the ability to offer items for sale, letting them conduct a bid and provide a bid management system (using a CEP system). One of the services it provides to the customer is an "alert that you are over-estimating the price you can get." A pattern on streaming events may include: If there has been at least two bidders but none of them have matched the minimum price of the seller then this may be an indication that "the bid is too expensive." A pattern on the historical events: at least ⅔ of the past bids of the same sellers have also resulted in a "too expensive bid" situation. If the on-line situation (i.e. pattern on streaming events) occurs then look for the reinforcement situation (pattern on historical events). If it is satisfied then the seller is sent a notification "you are too greedy."

In one embodiment, an application that requires both streaming and retrospective event processing is divided into (1) event processing with its own abstractions, languages, execution models and optimizations that implement patterns on streaming events; and (2) temporal databases which support temporal queries on historical data. Historical events are expressed as temporal data and patterns are expressed as temporal queries.

In another embodiment, in applications that require both types of functions on-line, effectiveness and efficiency are achieved by combining streaming and historical event processing pattern language elements into the same language. Regarding effectiveness, rather than have two code bases in two different languages with the need to integrate these two code bases every time a combined application is needed, an embodiment of the invention combines the two into a single pattern language. Regarding efficiency, the event processing optimization scheme takes into account the entire event processing functions, wherein the entire system is within the control of the optimization system. The optimization system of the present invention considers the historical event patterns, thus improving the results achievable by the optimization system.

Figure 2:
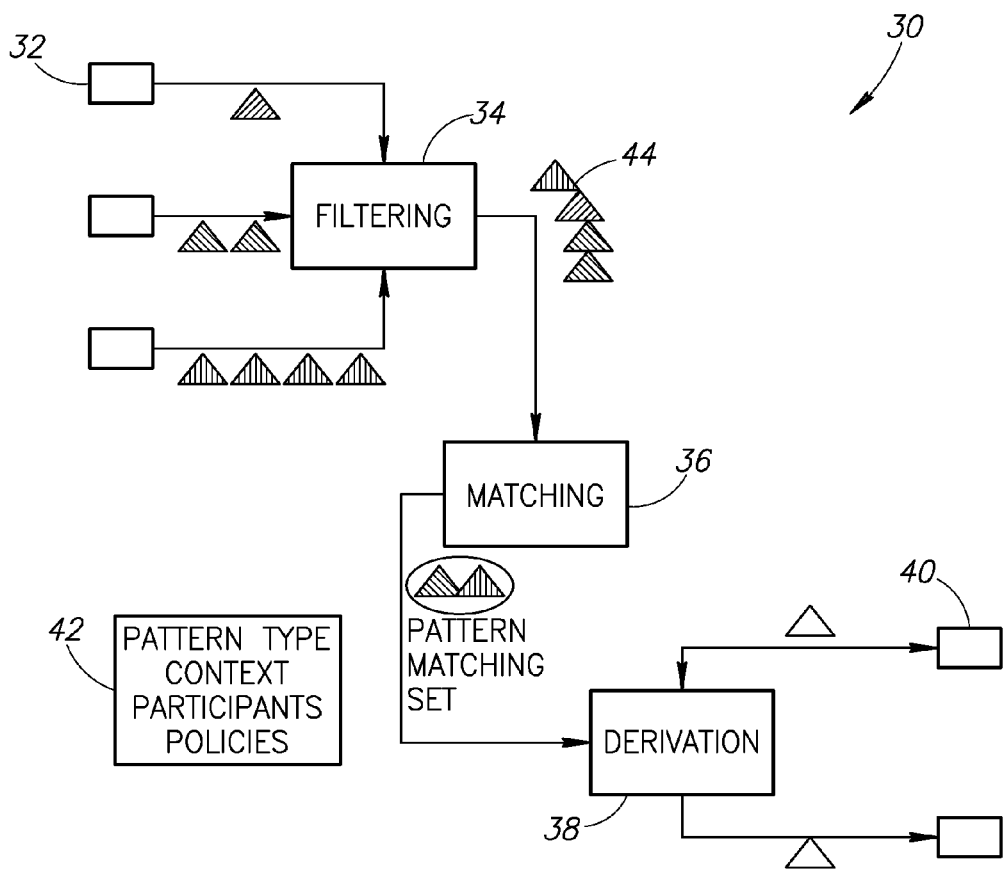
FIG. 2 is a diagram illustrating an example pattern matching process.

A diagram illustrating an example on-line pattern matching process is shown in FIG. 2. The process, generally referenced 30, comprises filtering 34, matching 36 and derivation 38 blocks, policy block 42, a plurality of input terminals 32, output terminals 40 and event data sets (triangles 44). In the on-line matching process, events are first filtered and output is generated according to the relevant conditions for the specific patterns. Then matching conditions are applied to the filtered event output to generate one or more matched and derived events. Taking as an example one of the examples discussed supra: A patient was admitted to the hospital less than 24 hours after being discharged. The process description is as follows: (1) relevant events are admission and discharge events; (2) the matching process finds pairs of events in which the patient is identical and the timestamp difference is less than 24 hours; (3) upon the detection of such an event pair, a derived event is generated using relevant information from the discharge and admission event. The derived event is sent for further processing or to the end consumer.

Figure 3:
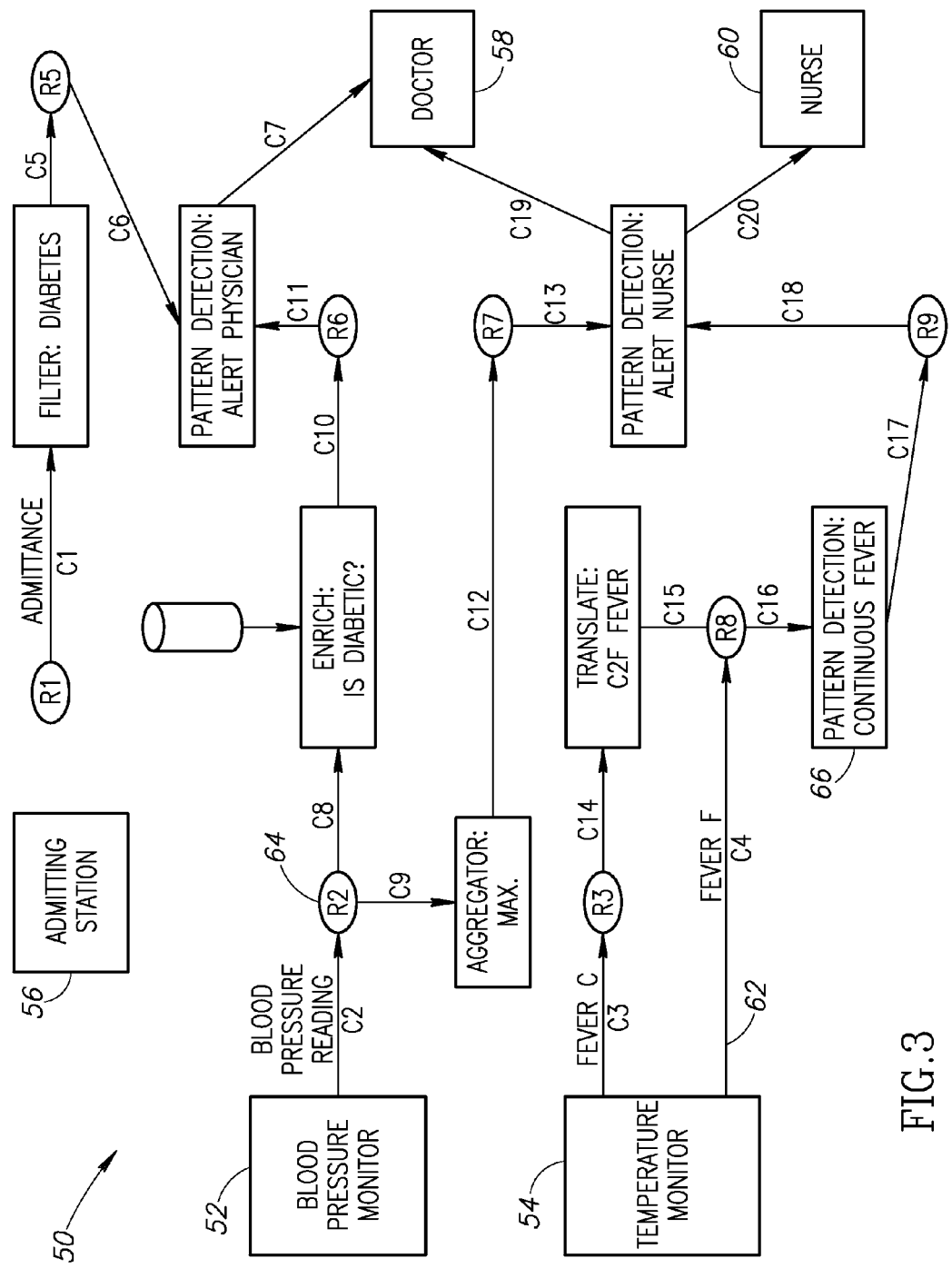
FIG. 3 is a diagram illustrating an example event processing network (EPN)

The software that performs the matching process is referred to as an Event Processing Agent (EPA). The connectivity and organization of the various event processing agents form an event flow graph called an Event Processing Network (EPN). A diagram illustrating an example event processing network (EPN) is shown in FIG. 3. The example network, generally referenced 50, comprises a plurality of inputs 52, 54, 56, outputs 58, 60, routers 64 and EPAs 66 connected by channels 62.

In this example event processing network, various patterns are connected in an event flow graph. The nodes designated by r1 through r9 comprise routing channels that determine whether to route the event for further processing. The EPAs perform the pattern detection and aggregation. The three inputs comprise admitting station information 56, blood pressure readings 52 and temperature readings 54. The outputs comprise a physician 58 and nurse 60. Depending on the input data and the processing performed by the EPAs, the physician or the nurse may be alerted.

In accordance with an embodiment of the invention, the conventional event processing pattern language is extended to include pattern detection for both on-line streaming events and historical events. Having the language extensions to handle historical pattern matching as well as streaming events has the advantage of eliminating the need for glue code that would be necessary in the case of two disparate languages and systems, one for streaming events and one for historical events. An example of a single language incorporating language elements for both streaming and historical (i.e. retrospective) events is presented below in Table 1.

The linguistic construct in event processing is a pattern. The following Table 1 provides an example list of patterns.

TABLE 1

Example Pattern Language for Handling
Both Streaming and Historical Events

| Category | Pattern | Description |
| --- | --- | --- |
| Basic | All | Conjunction |
|  | Any | Disjunction |
| Threshold | Count | Count of event compared relative to threshold |
|  | Sum | Sum of some attribute is compared relative to threshold |
|  | Value max | Maximal value of some attribute is compared relative to threshold |
|  | Value min | Minimal value of some attribute is compared relative to threshold |
|  | Value average | Minimal value of some attribute is compared relative to threshold |
| Relative | Relative min | The minimal value of this attribute among the input events |
|  | Relative max | The maximal value of this attribute among the input events |
| Modal | Absence | Event does not exist among relevant events |
|  | Always | Assertion is always satisfied for all relevant events |
|  | Sometimes | Assertion is sometimes satisfied for all relevant events |
|  | Not selected | This event has not been selected by all matching processes for a certain pattern |
| Temporal | Sequence | Conjunction of event within a predetermined order |
|  | Increasing | Some attribute value is consistently increasing |
|  | Decreasing | Some attribute value id consistently decreasing |
|  | Stable | Some attribute value is stable |
|  | Non increasing | Some attribute value is consistently non increasing |
|  | Non decreasing | Some attribute value is consistently non increasing |
|  | Mixed | Non consistent trend for some attribute |
| Spatial | Min distance | Minimal distance to a certain object is compared to a threshold |
|  | Max distance | Maximal distance to a certain object is compared to a threshold |
|  | Average distance | Average distance to a certain object is compared to a threshold |
|  | Relative Min distance | Minimal distance among the relevant events is compared to A threshold |

TABLE 1-continued

Example Pattern Language for Handling
Both Streaming and Historical Events

| Category | Pattern | Description |
| --- | --- | --- |
| | Relative Max distance | Minimal distance among the relevant events is compared to A threshold |
| | Relative Average distance | Minimal distance among the relevant events is compared to A threshold |
| Spatiotemporal | Moving in consistent direction | The events in the set move in a certain direction: N, S . . . |
| | Moving in mixed direction | The events in the set move in mixed direction |
| | Stationary | The events in the set occur in the same location |
| | Moving Towards | The events in the set move towards some object |

Note that the language comprises patterns for several categories, including Basic, Threshold, Relative, Modal, Temporal and Spatial categories. Note also that the language includes recursion whereby constructs of patterns of patterns, and so on can be used. Typically, however, most systems only use one or two levels of pattern recursion. It is appreciated that higher levels of recursion may be implemented depending on the particular system and application.

The retrospective processing patterns added to the pattern language are in contrast to systems where they are typically expressed within a collection of queries. Using the pattern language of the invention, the entire event processing function is expressed in a seamless language. Consider the following example:

An example pattern follows:

Part 1: A person that has deposited (in aggregate) more than $20,000 within a single working day is a SUSPECT in money laundering. To reinforce this suspicion a modal pattern is applied to the past (i.e. retrospective).

Part 2: There has been a period of a week within the last year in which the same person has deposited (in aggregate) $50,000 or more and has withdrawn (in aggregate) at least $50,000 within the same week.

Note that Part 1 above can be expressed by the SUM pattern, where the temporal context to select the relevant events is a single "working day". Thus for each day, another instance of the EPA implemented for this pattern is opened and closed, whereby the events are of type deposit and the threshold value is the SUM over the attribute deposit-amount. The pattern is satisfied if the SUM element of this attribute is greater than $20,000.

Part 2 above, however, cannot be expressed by the pattern language as is, since operators relate to a single set of events. Thus we need to consider a set of sets of events (each period of a week constitutes a set). The solution to this is to add patterns that work on set of sets, in two levels:

1. A regular pattern for each set (in this example—a period of a week).

2. A modal pattern that works across sets, looking at each set as elements within a larger set.

In this example, the pattern will be as follows:
Primary context=last year; secondary context=week;
Primary pattern=sometimes;
Secondary pattern=Sum (deposited-amount>$50,000).

This pattern is executed in the following way: First, the primary context is set backwards in time from now. The primary context is partitioned to a secondary context according to the unit of time specified. Then, each secondary context is treated as a relevant time interval, and a regular event processing pattern is applied to it. If there is a pattern match for this secondary context, then the secondary context is marked as "true," else the secondary context is marked as "false." Finally, a modal pattern (always, sometimes) is applied for the entire set, and either true or false is returned. If true is returned, then the on-line pattern is reinforced.

Figure 4:
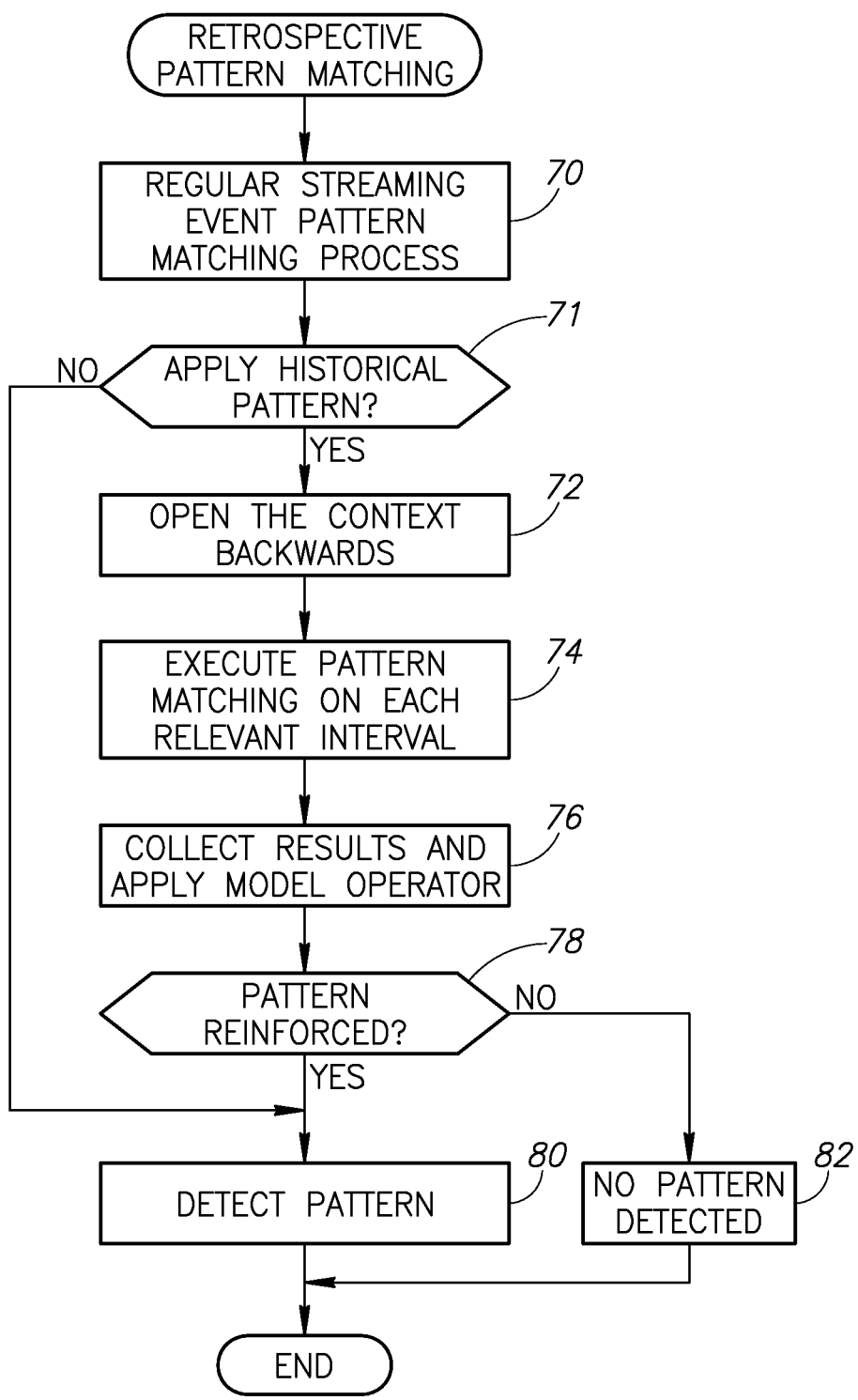
FIG. 4 is a flow diagram illustrating an example retrospective pattern matching process.

A flow diagram illustrating an example retrospective pattern matching process (reinforcement process) is shown in FIG. 4. The regular streaming event pattern matching process if performed (step 70). If historical patterns need to be applied (step 71), than the context is opened backwards (step 72). Note that primary and secondary contexts enable the process to look backwards in time on past events while currently handling streaming events whereby the time context advances forward, thus creating a time travel effect.

Pattern matching is applied each relevant interval (step 74) and the results are collected and applied to the model operator (step 76). If the pattern is reinforced (step 78), a pattern detected indication is generated (step 80), otherwise a no pattern detected indicated is generated (step 82). If a historical pattern does not need to be applied, than the method continues with detect pattern (step 80). Note that applying modal patterns on a set of sets of events extends the capabilities of the pattern language and extends the execution model.

The execution model described herein enables both parts of the pattern to be written in the same language without the need to use two different languages, and thus significantly improves the effectiveness of the system. Note that in alternative embodiments, different language extensions may be provided to support retrospective event processing.

Figure 5:
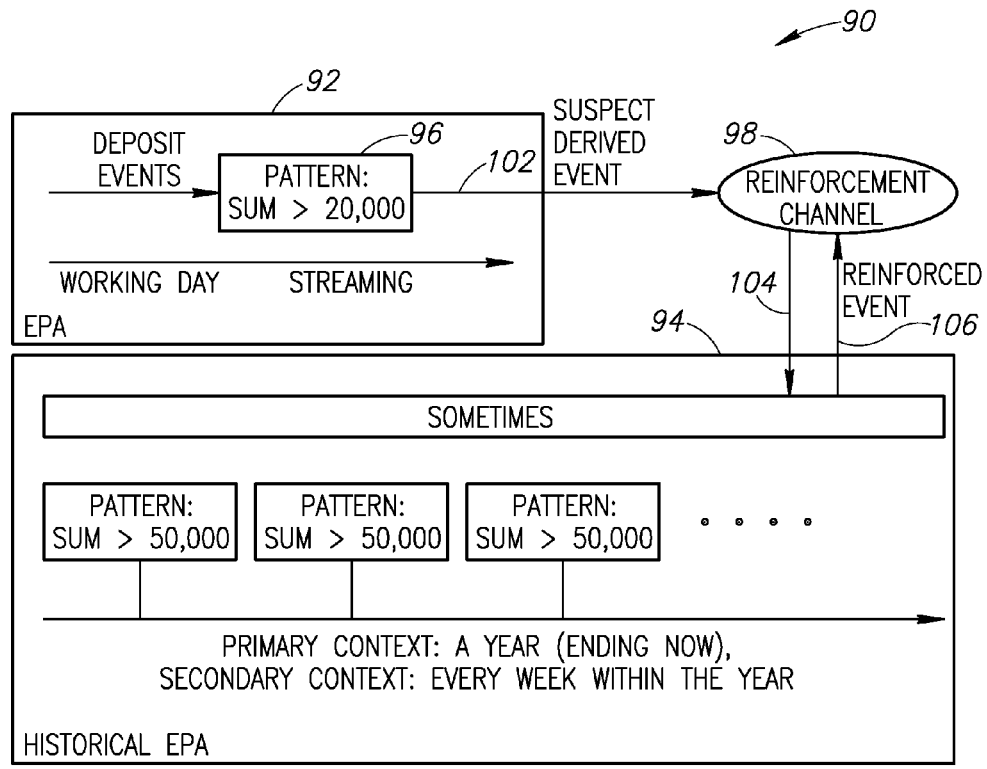
FIG. 5 is a diagram illustrating a combined example of both on-line streaming and retrospective event processing in accordance with an example embodiment of the present invention.

A diagram illustrating a combined example of both on-line streaming and retrospective event processing agents in accordance with an example embodiment of the present invention is shown in FIG. 5. The combined example, generally referenced 90, comprises a streaming EPA 92 and a historical EPA 94. The streaming EPA comprises a SUM pattern which looks for deposit events over $20,000. The output is a suspect derived event 102 that is input to the reinforcement channel 98 which determines whether the suspect derived event is reported for further processing or is ignored.

The historical EPA 94 comprises a sometimes pattern with primary context of a year (ending now) and secondary contexts 100 of every week within the year, each having the pattern SUM>$50,000. The input to EPA 94 is the suspect derived event 104. If the suspected event is reinforced (i.e. the EPA 94 evaluates to true), a reinforcement event 106 is passed back to the reinforcement channel 98.

Combined Optimization

In accordance with an embodiment of the invention, having patterns for both streaming and historical event processing in the same language (i.e. using the same EPA model) enables the entire system to be optimized. This is enabled by the mapping of the retrospective (i.e. historical) processing into EPAs.

Regarding the issue of event processing optimization, one technique for optimizing an event processing application is to make a decision about the assignment of EPAs to a physical processor and to threads within the physical processor. Note that the optimization may have various desired functions (e.g., maximize throughput or minimize latency).

Figure 6:
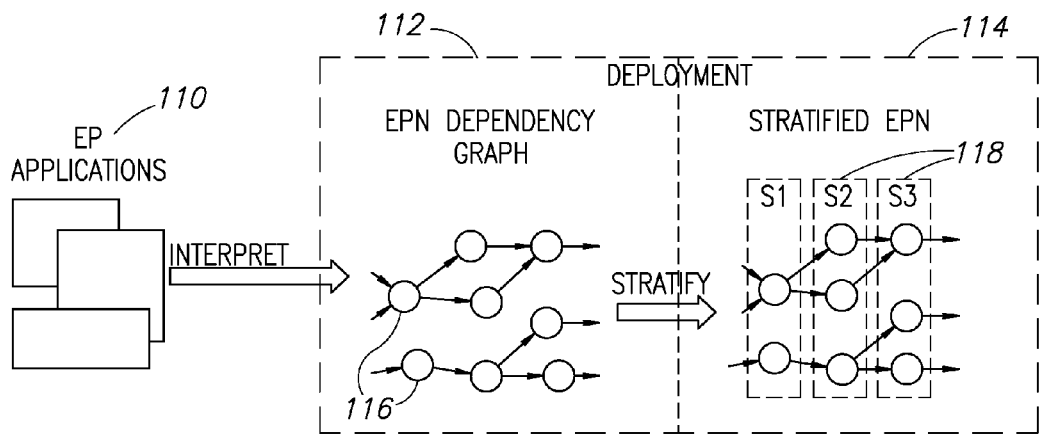
FIG. 6 is a diagram illustrating an example event processing application and subsequent stratification of the event processing network.

A diagram illustrating an example event processing application and subsequent stratification of the event processing network is shown in FIG. 6. The partition comprises the event processing application 110, event processing network (EPN)

dependency graph 112 comprising a plurality of EPAs 116 and stratified EPN 114 comprising a plurality of strata 118 which are composed of a plurality of EPAs. The network is partitioned based on the EPN dependency graph 112. The partition effectively partitions the graph into a collection of EPAs that can execute in parallel. In this illustrative example, three different strata are generated, namely S1, S2, S3. Note that within each stratum, the EPAs are independent of each other. This serves as a basis for further optimization, utilizing heuristics to assign each EPA to a processor/thread and to perform load balancing at run-time.

Figure 7:
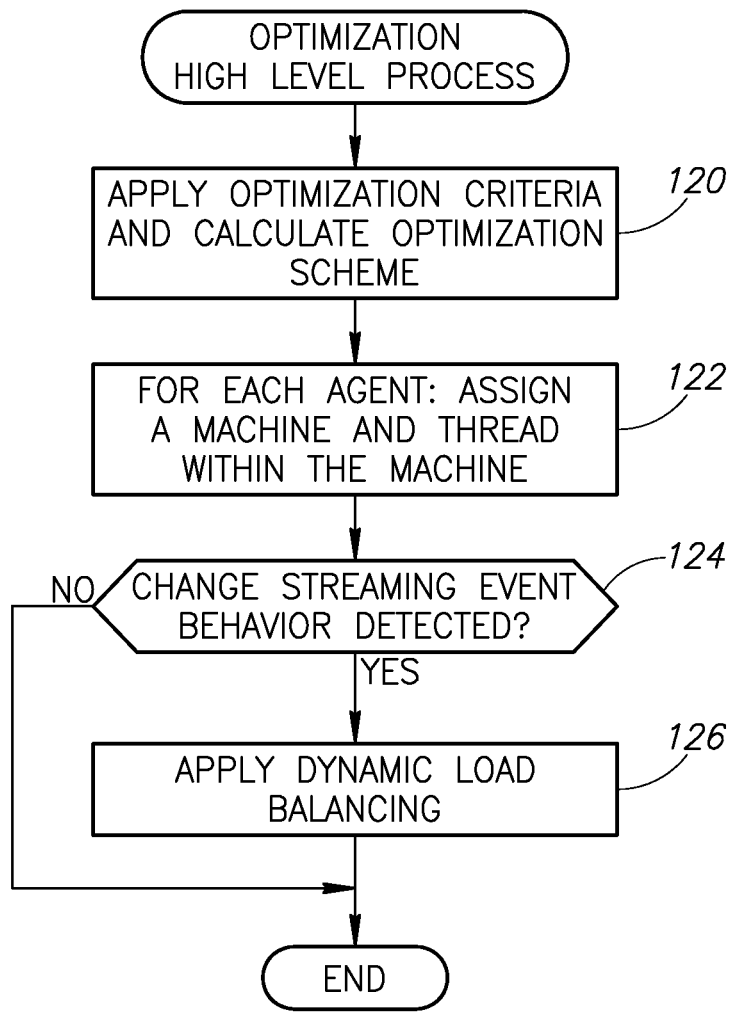
FIG. 7 is a flow diagram illustrating an example high level optimization process in accordance with an example embodiment of the present invention.

A flow diagram illustrating an example high level optimization process in accordance with an example embodiment of the present invention is shown in FIG. 7. While the actual optimization itself is critical to the invention, the ability to perform an optimization process on the system is possible due to the fact that the invention allows a retrospective event processing function to be mapped to an EPA allowing it to be part of the optimization process, as the optimization process requires information about event flow dependencies with the other EPAs in order to be able to map it to the appropriate stratum.

First, the optimization criteria are applied and the optimization scheme is calculated (step 120). For each EPA, assign a processor (i.e. machine) and a thread within the machine (step 122). If a change in streaming event behavior is detected (step 124), apply dynamic load balancing (step 126).

As discussed supra, a retrospective processing function can be mapped into a logical EPA. Typically in streaming event patterns, each logical EPA is mapped into a single physical EPA. In the retrospective case, however, this EPA can be further decomposed, due to the fact that the secondary contexts that are part of the EPA are independent of each other. This decomposition is shown in FIG. 5 described supra.

Figure 8:
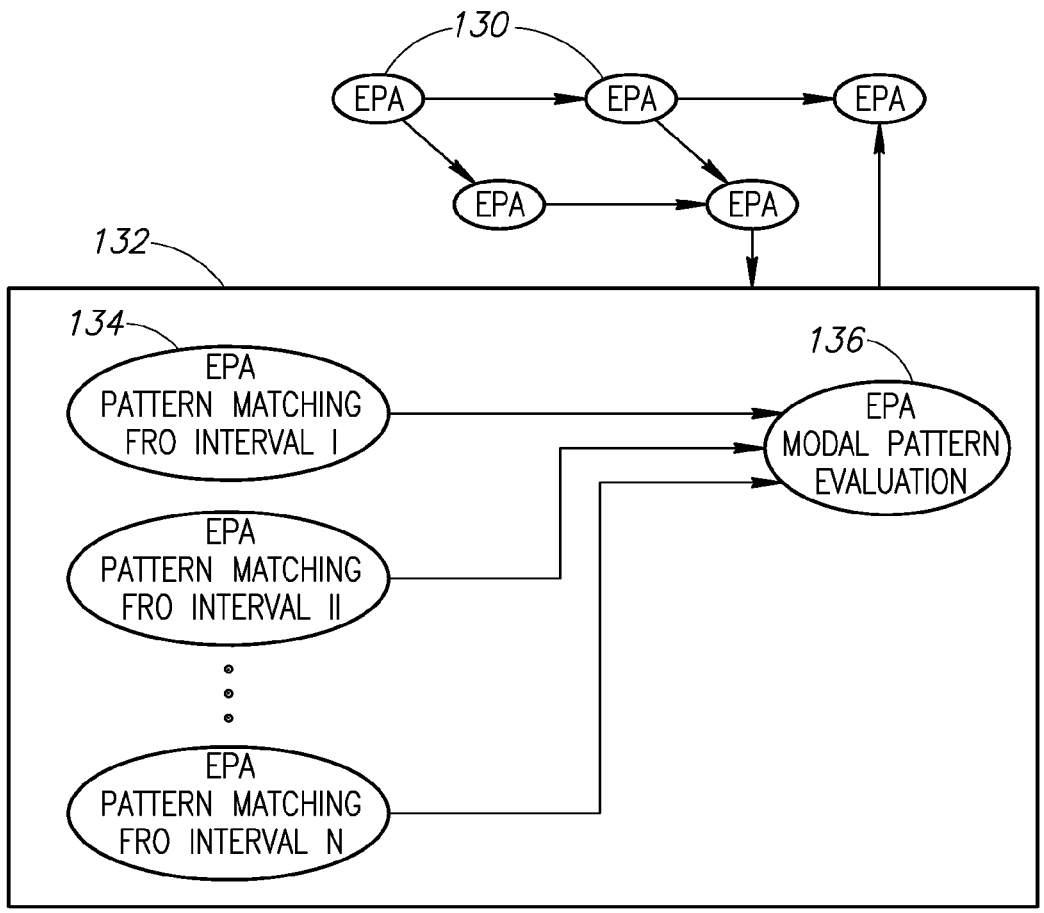
FIG. 8 is a diagram illustrating an example partition of event processing agents (EPAs) to run-time artifacts.

A diagram illustrating an example partition of event processing agents (EPAs) to runtime artifacts is shown in FIG. 8. The diagram shows a streaming event EPN dependency graph enhanced by a collection of agents 132 that can be decomposed further and which enables historical events to be viewed as part of the EPA graph, which enables the use of a single optimization scheme for both types of pattern matching, i.e. streaming and historical.

The graph comprises a plurality of streaming EPAs 130 and a collection 132 of historical EPAs 134 and a modal pattern evaluation EPA 136. EPAs 134 (i.e. pattern matching for intervals 1 through N) can be executed in parallel. The primary context 136 collects and evaluates the output of all N EPAs 134.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of event processing, said method comprising:
providing an event processing pattern language operative to be implemented and executed on a system having at least a computer processor;
first extending said event processing pattern language to support historical patterns thereby enabling a user to define patterns comprised of both on-line streaming and retrospective historical patterns utilizing a single pattern language, wherein said historical patterns include a time window determined in an event-driven manner open from the present time backwards thereby providing pattern detection for both on-line streaming events and historical events;
second extending said event processing pattern language with a primary and secondary context pattern language extension for looking backwards in time on past events while simultaneously handling time advancing forward in on-line streaming events thereby enabling both primary and secondary context pattern languages to be written in the single pattern language;
wherein said first and second extending extend said event processing language to retrospective processing functions and enable the retrospective processing functions to be mapped into logical event processing agents (EPAs);
and wherein said steps of providing, first extending and second extending are implemented in either of computer hardware configured to perform said providing and extending steps, and computer software embodied in a non-transitory, tangible, computer-readable storage medium.

2. The method according to claim 1, wherein said second extended event processing process language is operative to extend event processing execution model to support two phased retrospective processing execution based on primary and secondary context pattern languages.

3. The method according to claim 1, wherein said step of second extending comprises mapping extended event processing pattern language functions into one or more physical event processing agents (EPAs).

4. A computer-implemented method of event processing, said method comprising the steps of:
providing an event processing pattern language suitable for handling streaming event least a computer processor;
adding retrospective pattern language extensions to said event processing pattern language such that the resulting extended event pattern processing language is capable of handling retrospective event processing in addition to said streaming event processing, wherein retrospective events include a time window determined in an event-driven manner open from the present time backwards thereby providing pattern detection for both on-line streaming events and historical events utilizing a single pattern language;

extending said event processing pattern language with a primary and secondary context pattern language extension for looking backwards in time on past events while simultaneously handling time advancing forward in on-line streaming events thereby enabling both primary and secondary contexts context pattern languages to be written in the same single pattern language;

wherein said first and second extending extend said event processing pattern language to retrospective processing functions and enable the retrospective processing functions to be mapped into logical event processing agents (EPAs);

and wherein said steps of providing, adding and extending are implemented in either of computer hardware configured to perform said providing and adding steps, and computer software embodied in a non-transitory, tangible, computer-readable storage medium.

5. The method according to claim 4, wherein said retrospective pattern language extensions enable an event processing system to reinforce pattern assumptions.

6. The method according to claim 4, wherein said retrospective pattern language extensions are operative to extend event processing execution model to support two phased retrospective processing execution based on primary and secondary context pattern languages.

7. The method according to claim 4, wherein said retrospective pattern language extensions comprise mapping pattern functions into one or more physical event processing agents (EPAs).

8. The method according to claim 7, wherein said EPAs are part of an application event processing network (EPN) with dependencies modeled therein.

9. The method according to claim 4, wherein said retrospective pattern language extensions enable retrospective processing to participate in an optimal process based on the structure of a respective event processing network (EPN).

10. The method according to claim 4, further comprising the step of partitioning an EPN dependency graph into one or more collections of EPAs that are capable of executing in parallel without dependencies therebetween, each collection defining an EPN stratum.

11. The method according to claim 4, further comprising the step of mapping retrospective event processing into one or more event processing agents (EPAs).

12. The method according to claim 11, wherein step of mapping comprises the step of assigning EPAs to physical processes and to threads within a processor.

13. The method according to claim 12, further comprising the step of performing real time load balancing between said processes.

14. The method according to claim 4, wherein said extended event processing language is operative to provide a single optimal language for performing both on-line streaming and retrospective pattern matching.

15. The method according to claim 4, further comprising the step of applying modal patterns on a set of sets of events utilizing said extended event processing language.

16. The method according to claim 4, further comprising the step of storing historical events in memory and passing said historical events to one or more event processing agents.

17. The method according to claim 4, further comprising the step of storing historical events in a database for one or more patterns and passing said stored historical events to one or more event processing agents.

18. A computer-implemented process for providing an extended event processing pattern language framework for supporting historical patterns and associated retrospective event processing, the process performing the following actions:

the framework providing both streaming event patterns and retrospective event pattern extensions, said framework operative to be implemented and executed on a system having at least a computer processor, wherein retrospective events include a time window determined in an event-driven manner open from the present time backwards thereby providing pattern detection for both on-line streaming events and historical events utilizing a single pattern language;

the framework extending, on said computer, said event processing pattern language with a primary and secondary context pattern language extension for looking backwards in time on past events while simultaneously handling time advancing forward in on-line streaming events thereby enabling both primary and secondary context pattern languages to be written in the single pattern language;

the framework operative to support said extended event processing pattern language including retrospective extensions thereby enabling multi-phased retrospective processing execution based on multiple contexts; and wherein said first and second extending extend said event processing pattern language to retrospective processing functions and enable the retrospective processing functions to be mapped into logical event processing agents (EPAs).

19. The process according to claim 18, wherein said extended event processing pattern language is operative to extend event processing execution model to support two phased retrospective processing execution based on primary and secondary context pattern languages.

20. The process according to claim 18, wherein said event processing framework comprises means for mapping extended event processing pattern language functions into one or more physical event processing agents (EPAs).

21. A computer program product for performing event processing, the computer program product comprising:

a tangible, non-transitory computer usable medium having computer usable code embodied therewith, the computer usable program code comprising:

computer usable code configured for providing an event processing language suitable for handling streaming event processing;

computer usable code configured for extending said event processing pattern language with a primary and secondary context pattern language extension for looking backwards in time on past events while simultaneously handling time advancing forward in on-line streaming events thereby providing pattern detection for both on-line streaming events and historical events utilizing a single pattern language;

computer usable code configured for adding retrospective pattern language extensions to said event processing language such that the resulting extended event processing language is capable of handling retrospective event processing in addition to said streaming event processing, wherein retrospective events include a time window determined in an event-driven manner open from the present time backwards thereby enabling both primary and secondary context pattern languages to be written in the single pattern language;

wherein said first and second extending extend said event processing pattern language to retrospective processing functions and enable the retrospective processing functions to be mapped into logical event processing agents (EPAs).

22. A computer program product for performing event processing, the computer program product comprising:

a tangible, non-transitory computer usable medium having computer usable code embodied therewith, the computer usable program code comprising:

computer usable code configured for providing an event processing pattern language;

computer usable code configured for extending said event processing pattern language with a primary and secondary context pattern language extension for looking backwards in time on past events while simultaneously handling time advancing forward in on-line streaming events enabling both primary and secondary context pattern languages to be written in a same single pattern language;

computer usable code configured for extending said event processing pattern language to support historical patterns thereby enabling a user to define patterns comprised of both on-line streaming and retrospective historical patterns utilizing the single pattern language, wherein retrospective events include a time window determined in an event-driven manner open from the present time backwards thereby providing pattern detection for both on-line streaming events and historical events;

and wherein said first and second extending extend said event processing pattern language to retrospective processing functions and enable the retrospective processing functions to be mapped into logical event processing agents (EPAs).

* * * * *